United States Patent
Burian (10) Patent No.: US 11,778,978 B1
(45) Date of Patent: Oct. 10, 2023

(54) KITTY WATER POTTY TRAINER AND ASSOCIATED METHOD(S)

(71) Applicant: Richard Burian, Gardena, CA (US)

(72) Inventor: Richard Burian, Gardena, CA (US)

( * ) Notice: Subject to any disclaimer, the term of this patent is extended or adjusted under 35 U.S.C. 154(b) by 0 days.

(21) Appl. No.: 18/177,838

(22) Filed: Mar. 3, 2023

(51) Int. Cl.
*A01K 1/01* (2006.01)
*A01K 15/02* (2006.01)

(52) U.S. Cl.
CPC ............ *A01K 1/0107* (2013.01); *A01K 15/02* (2013.01)

(58) Field of Classification Search
CPC .. A01K 1/0107; A01K 1/0114; A01K 1/0121; A01K 1/011; A01K 1/0125; A01K 15/02
USPC ......................................................... 119/165
See application file for complete search history.

(56) References Cited

U.S. PATENT DOCUMENTS

| | | | |
|---|---|---|---|
| 6,860,231 B1 * | 3/2005 | Rus ...................... | A01K 1/0121 119/165 |
| 9,232,766 B1 * | 1/2016 | Strohdach, Sr. ..... | A01K 1/0121 |
| 2002/0078899 A1 * | 6/2002 | Chiu .................... | A01K 1/0121 119/162 |
| 2008/0202439 A1 * | 8/2008 | Lapidge ............... | A01K 1/0121 119/162 |
| 2009/0211530 A1 * | 8/2009 | Yu ........................ | A01K 1/0121 119/162 |
| 2020/0178492 A1 * | 6/2020 | Rescate ................ | A01K 1/0121 |

* cited by examiner

*Primary Examiner* — Ebony E Evans
(74) *Attorney, Agent, or Firm* — Ashkan Najafi (57) ABSTRACT

A kitty water potty training apparatus includes a base configured to be supported on a ground surface, a plurality of exterior platform members removably engaged with an exterior surface of the base, a plurality of interior platform members removably engaged with an interior surface of the base and terminated beneath the exterior platform members, respectively, a large reservoir configured to receive and contain cat litter and is removably nested within the base, and a small reservoir assembly configured to receive and contain both cat litter and water therein and is removably nested within the base. At least two portions of the small reservoir assembly are selectively interchanged from the base. The small reservoir assembly and the large reservoir are configured to simultaneously contain cat litter while the small reservoir assembly also contains water.

18 Claims, 11 Drawing Sheets

FIG. 18

KITTY WATER POTTY TRAINER AND ASSOCIATED METHOD(S)

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to animal toilets and, more particularly, to a modular kitty water potty trainer that teaches a cat to defecate and urinate in a designated target area by chronologically and sequentially positioning modular platforms and a small reservoir assembly at the designated target area to sequentially adjust a quantity of cat litter and water during a training time period. The modular kitty water potty trainer is a self-training device that uses litter and water in the same device at the same time to convert cats from using litter to using only water.

Prior Art

Many pets, especially cats, can be trained to use a litterbox. However, litter boxes must be cleaned, and the litter periodically changed. Litter can be accidentally moved out of the litter box by a cat and litter boxes can emit unappealing smells. This leads to a number of disadvantages, including odor, and the need to regularly remove feces. It is for these reasons that many cat owners prefer options other than litter boxes. The most obvious choice, other than a litterbox, is to train a cat to go to the bathroom exterior. However, for many people, such a choice is not possible. Many people do not have the time in their schedules to walk their cats at necessary times. Furthermore, many cats cannot be trained to safely roam free outdoors.

Moreover, an upset cat will not use the litter box. Because cats are naturally fastidious, it is hard to keep that area consistently clean and fresh. Cats are meticulously clean and cannot tolerate the smell or feel of a dirty box. If a cat cannot find a clean place to dig, the cat is out of there.

Furthermore, the average cost for litter annually is $300 or more. The money spent on litter accessories for cleanup and odor control can add-up. Household cleaning and food safety problems are caused by scattering litter and litter dust caught between the paws and body fur as well as urine and feces particles throughout the home as well as cooking, eating, and sleeping areas cannot be prevented by litter catcher mats.

Electro-mechanical litter systems do not work during a power outage and have to be plugged into an available outlet. Unlike the present disclosure they have a limited life spam, they can break down and jam up plus when it comes time to cleaning one it usually is not easy. Some of these devices have to use expensive cartridges and chemicals instead of water.

Accordingly, a need remains for a modular kitty water potty trainer in order to overcome at least one of the above-noted shortcomings. The exemplary embodiment(s) satisfy such a need by a modular kitty water potty trainer that teaches a cat to defecate and urinate in a designated target area that is convenient and easy to use, lightweight yet durable in design, versatile in its applications, and designed for chronologically and sequentially positioning modular platforms and a small reservoir assembly at the designated target area. Thus, cat litter and water are simultaneously used to train the cat.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a modular kitty water potty trainer that teaches a cat to defecate and urinate in a designated target area by chronologically and sequentially positioning small reservoirs, a detachable platform, and a large reservoir at the designated target area is disclosed, in accordance with non-limiting exemplary embodiment(s) of the present disclosure, to sequentially adjust a quantity of cat litter and water during a training time period. These and other objects, features, and advantages of the non-limiting exemplary embodiment(s) are provided by a kitty water potty training apparatus for teaching a cat to defecate and urinate in a designated target area with reduced cat owner input. The kitty water potty training apparatus includes a base configured to be supported on a ground surface, a plurality of exterior platform members removably engaged with an exterior surface of the base, a plurality of interior platform members removably engaged with an interior surface of the base and terminated beneath the exterior platform members, respectively, a large reservoir configured to receive and contain cat litter and is removably nested within the base, and a small reservoir assembly configured to receive and contain both cat litter and water therein and is removably nested within the base. Advantageously, at least two portions of the small reservoir assembly are selectively interchanged from the base. In this manner, the small reservoir assembly and the large reservoir are configured to simultaneously contain cat litter while the small reservoir assembly also contains water. Advantageously, the exterior platform members are interlocked and detachably coupled in a first circular configuration along an entire circumferential perimeter of the base. Advantageously, the interior platform members are interlocked and detachably coupled in a second circular configuration along an entire circumferential perimeter of the large reservoir.

In non-limiting exemplary embodiment, the exterior platform members are partially disposed exterior of the base and spaced from the interior platform members.

In non-limiting exemplary embodiment, each of the exterior platform members has a circumferential outer flange extended outwardly beyond a circumference of the base.

In non-limiting exemplary embodiment, the small reservoir assembly includes a segmented small reservoir wall seated on a bottom surface of the large reservoir, and a plurality of small reservoirs removably seated within an interior of the segmented small reservoir wall.

In non-limiting exemplary embodiment, each of the small reservoirs includes a first region configured to contain water, and a second region configured to contain cat litter and is isolated from the first region. Advantageously, the first region is centrally disposed about an exterior border of the second region.

In non-limiting exemplary embodiment, each of the first region has a unique first surface area, and each of the second region has a unique second surface area. Advantageously, a first one of the unique first surface area is less than a first one of the unique second surface area. Advantageously, a last one of the unique first surface area is greater than a last one of the unique second surface area.

In non-limiting exemplary embodiment, the small reservoir assembly further includes a small reservoir cap removably seated on the segmented small reservoir wall, and a small reservoir platform removably seated on the small reservoirs. Advantageously, the small reservoir platform is configured to selectively block access to the first region and the second region.

In non-limiting exemplary embodiment, each of the exterior platform members has an outer perimeter provided with a ribbed top surface.

In non-limiting exemplary embodiment, each of the interior platform members has an outer perimeter provided with a ribbed top surface.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means ±15% of the numerical.

If used herein, "substantially" means largely if not wholly that which is specified but so close that the difference is insignificant.

The terms "kitty water potty," "kitty water potty training apparatus," and similar terms are interchangeably used throughout the present disclosure.

The terms "companion," "auxiliary training apparatus," and similar terms are interchangeably used throughout the present disclosure.

Figure 1:
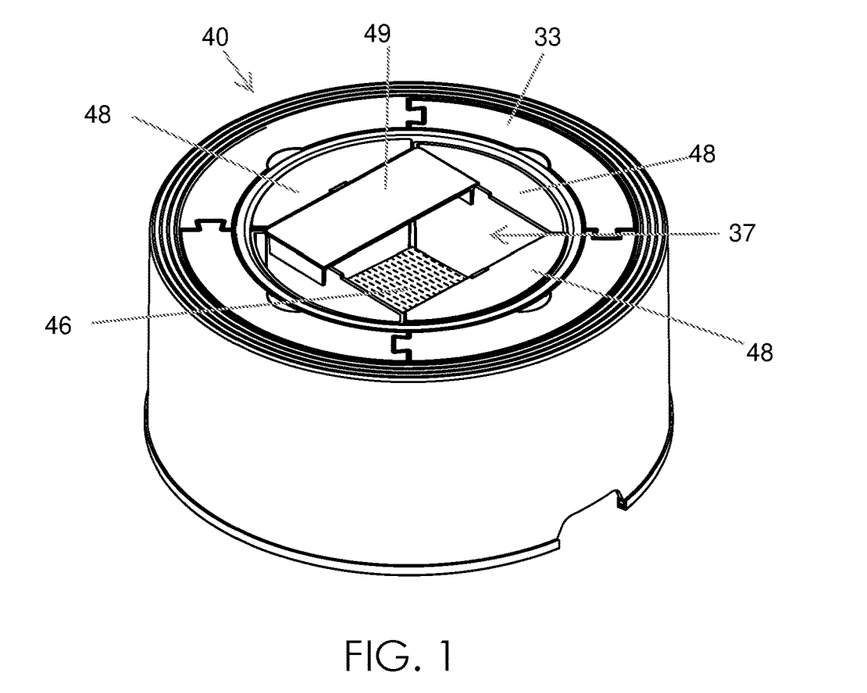
FIG. 1 is a perspective view of a kitty water potty training apparatus, in accordance with a non-limiting exemplary embodiment of the present disclosure.
Figure 2:
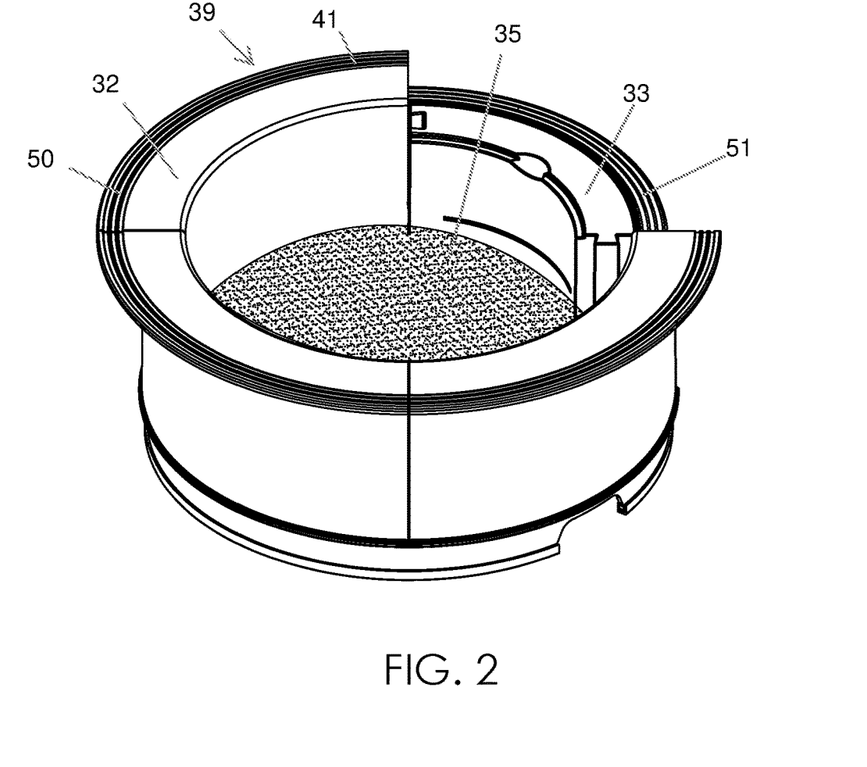
FIG. 2 is a perspective view of a partially assembled kitty water potty training apparatus wherein the small reservoir assembly is removed, in accordance with a non-limiting exemplary embodiment of the present disclosure.
Figure 3:
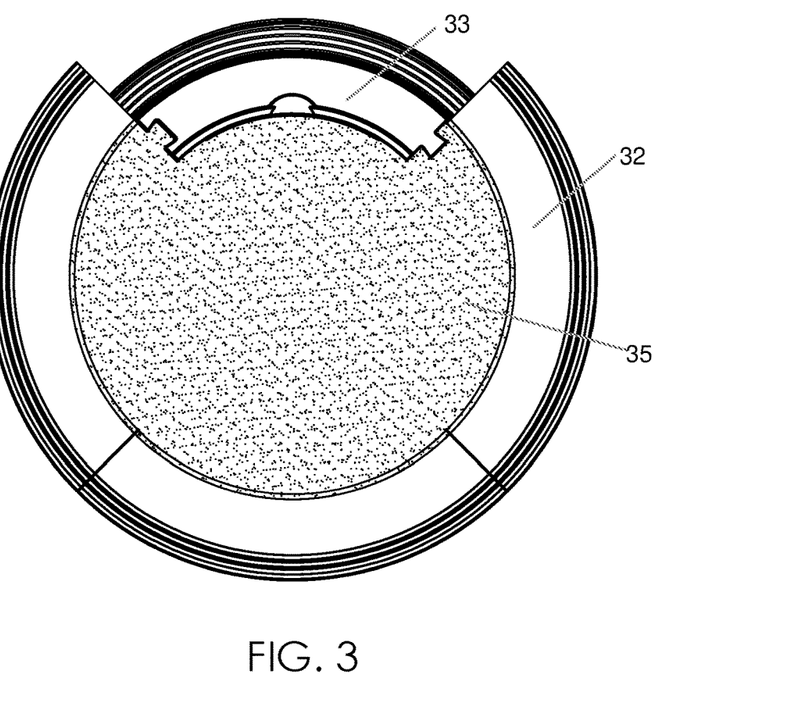
FIG. 3 is a top plan view of the kitty water potty training apparatus shown in FIG. 2, in accordance with a non-limiting exemplary embodiment of the present disclosure.
Figure 4:
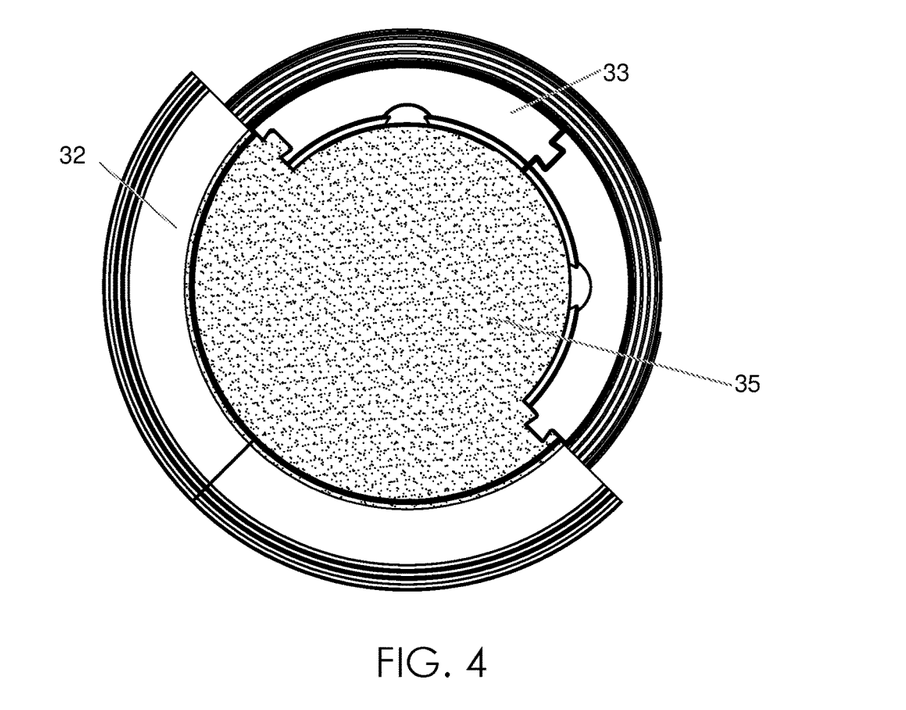
FIG. 4 is another top plan view of the kitty water potty training apparatus shown in FIG. 3, wherein an additional exterior flange member is removed from the base, in accordance with a non-limiting exemplary embodiment of the present disclosure.
Figure 5:
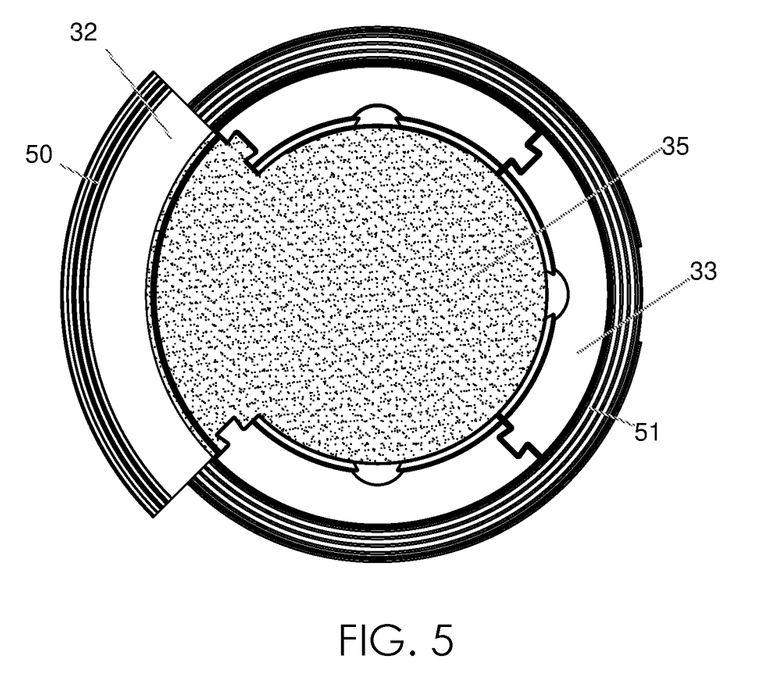
FIG. 5 is another top plan view of the kitty water potty training apparatus shown in FIG. 4, wherein an additional exterior flange member is removed from the base, in accordance with a non-limiting exemplary embodiment of the present disclosure.
Figure 6:
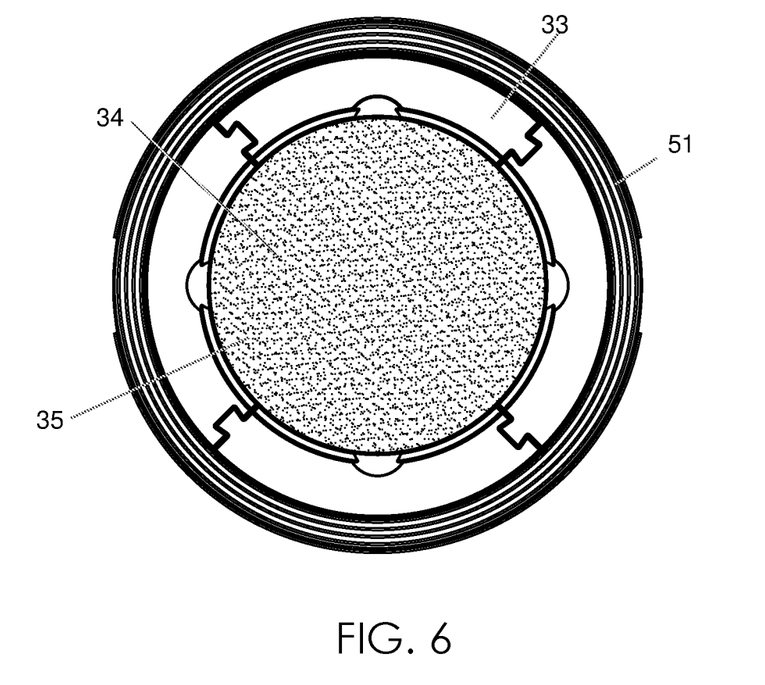
FIG. 6 is another top plan view of the kitty water potty training apparatus shown in FIG. 5, wherein all the exterior flange members are removed from the base, in accordance with a non-limiting exemplary embodiment of the present disclosure.
Figure 7:
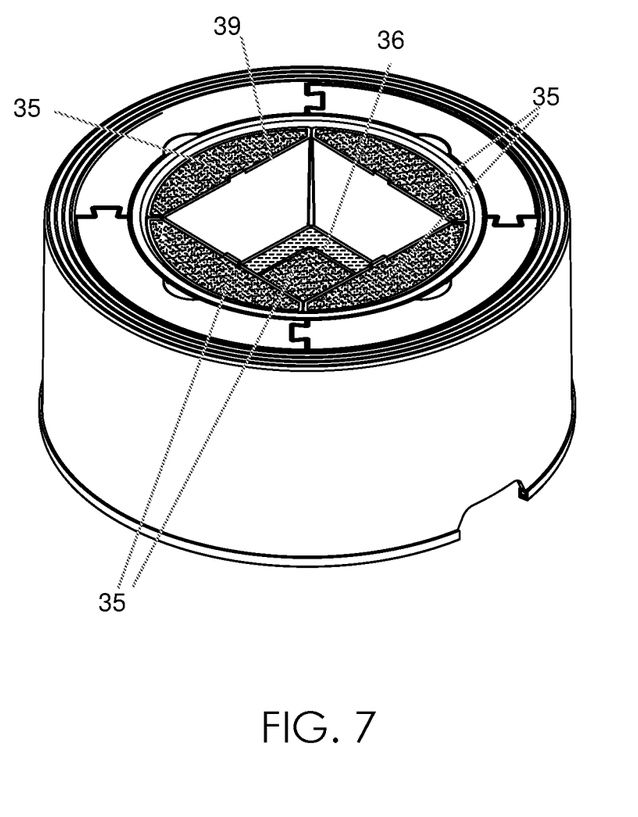
FIG. 7 is another perspective view of the kitty water potty training apparatus shown in FIG. 1, wherein portions of the small reservoir assembly have been removed, in accordance with a non-limiting exemplary embodiment of the present disclosure.
Figure 8:
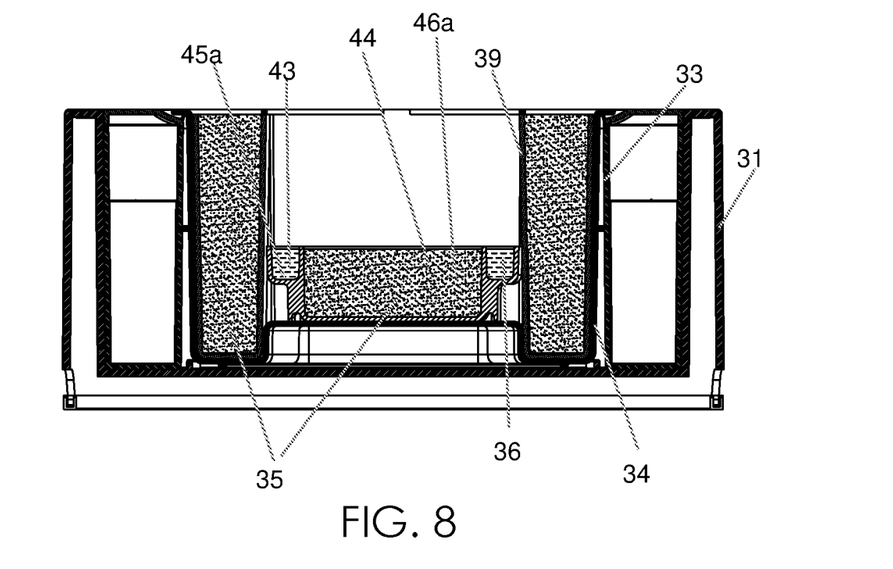
FIG. 8 is a cross-sectional view taken along line 8-8, and showing a minimal quantity of water contained in a small reservoir and a maximum quantity of cat litter contained in the large reservoir and the small reservoir, in accordance with a non-limiting exemplary embodiment of the present disclosure.
Figure 9:
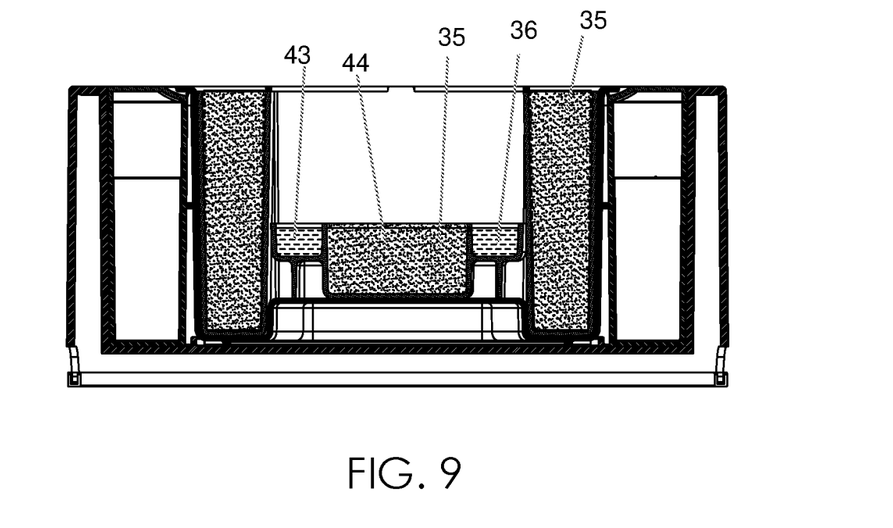
FIG. 9 is another cross-sectional view, relative to FIG. 8, showing a greater quantity of water contained in another small reservoir and a lesser quantity of cat litter contained in the large reservoir and the small reservoir, in accordance with a non-limiting exemplary embodiment of the present disclosure.
Figure 10:
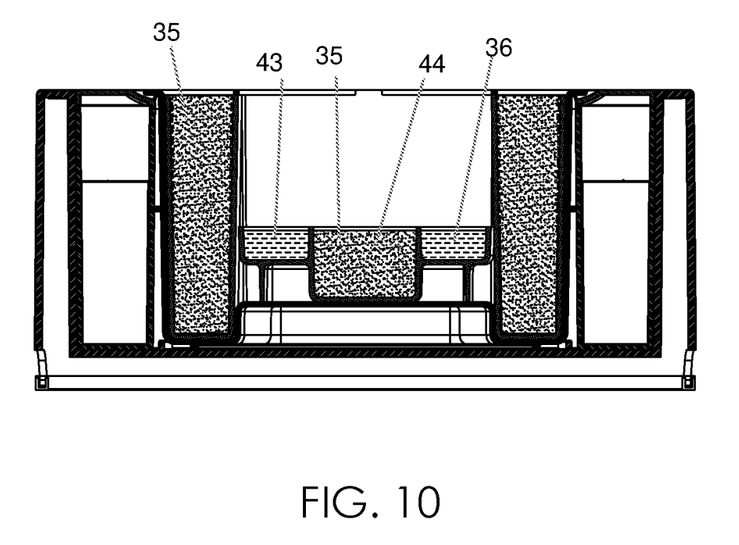
FIG. 10 is another cross-sectional view, relative to FIG. 9, showing yet a greater quantity of water contained in another small reservoir and a lesser quantity of cat litter contained in the large reservoir and the small reservoir, in accordance with a non-limiting exemplary embodiment of the present disclosure.
Figure 11:
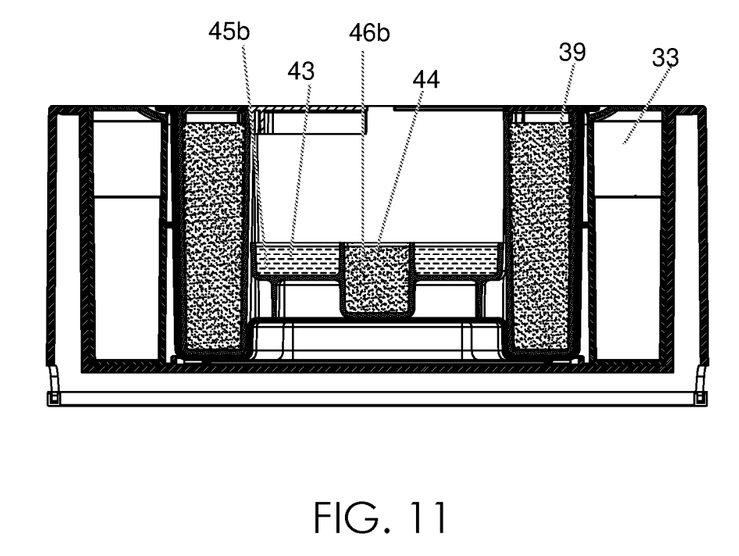
FIG. 11 is another cross-sectional view, relative to FIG. 10, showing yet a greater quantity of water contained in another small reservoir and a lesser quantity of cat litter contained in the large reservoir and the small reservoir, in accordance with a non-limiting exemplary embodiment of the present disclosure.
Figure 12:
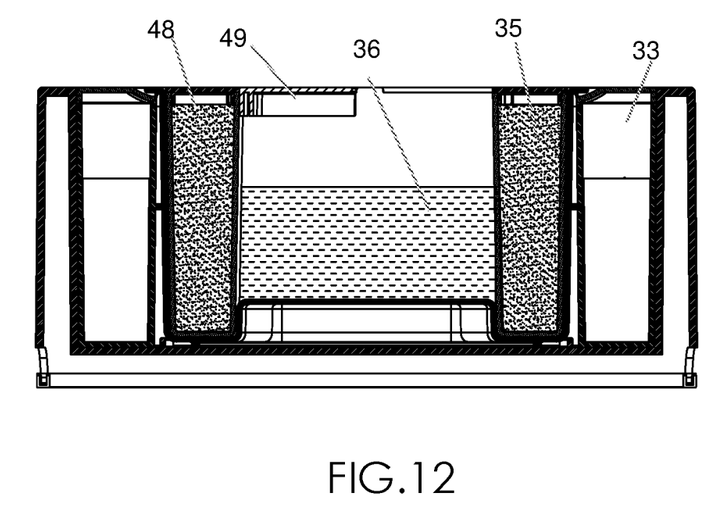
FIG. 12 is another cross-sectional view, relative to FIG. 11, showing yet a greater quantity of water contained in another small reservoir and a lesser quantity of cat litter contained in the large reservoir and the small reservoir, in accordance with a non-limiting exemplary embodiment of the present disclosure.
Figure 13:
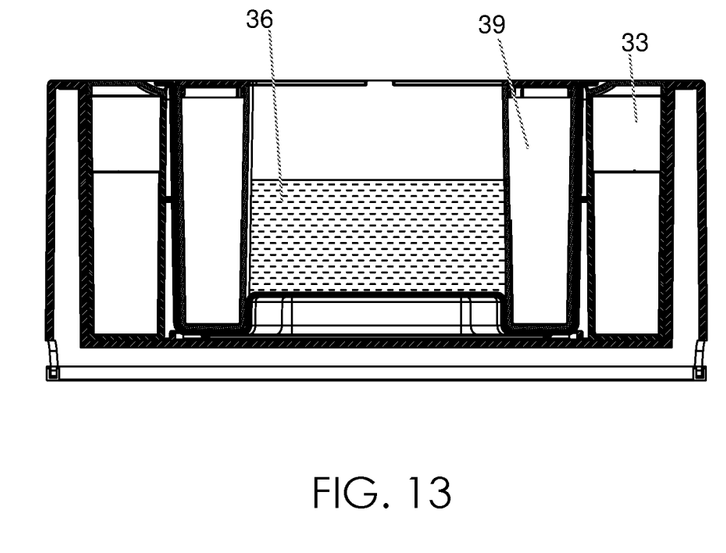
FIG. 13 is another cross-sectional view, relative to FIG. 12, showing a maximum quantity of water contained in the small reservoir and no cat litter contained in the large reservoir and the small reservoir, in accordance with a non-limiting exemplary embodiment of the present disclosure.
Figure 14:
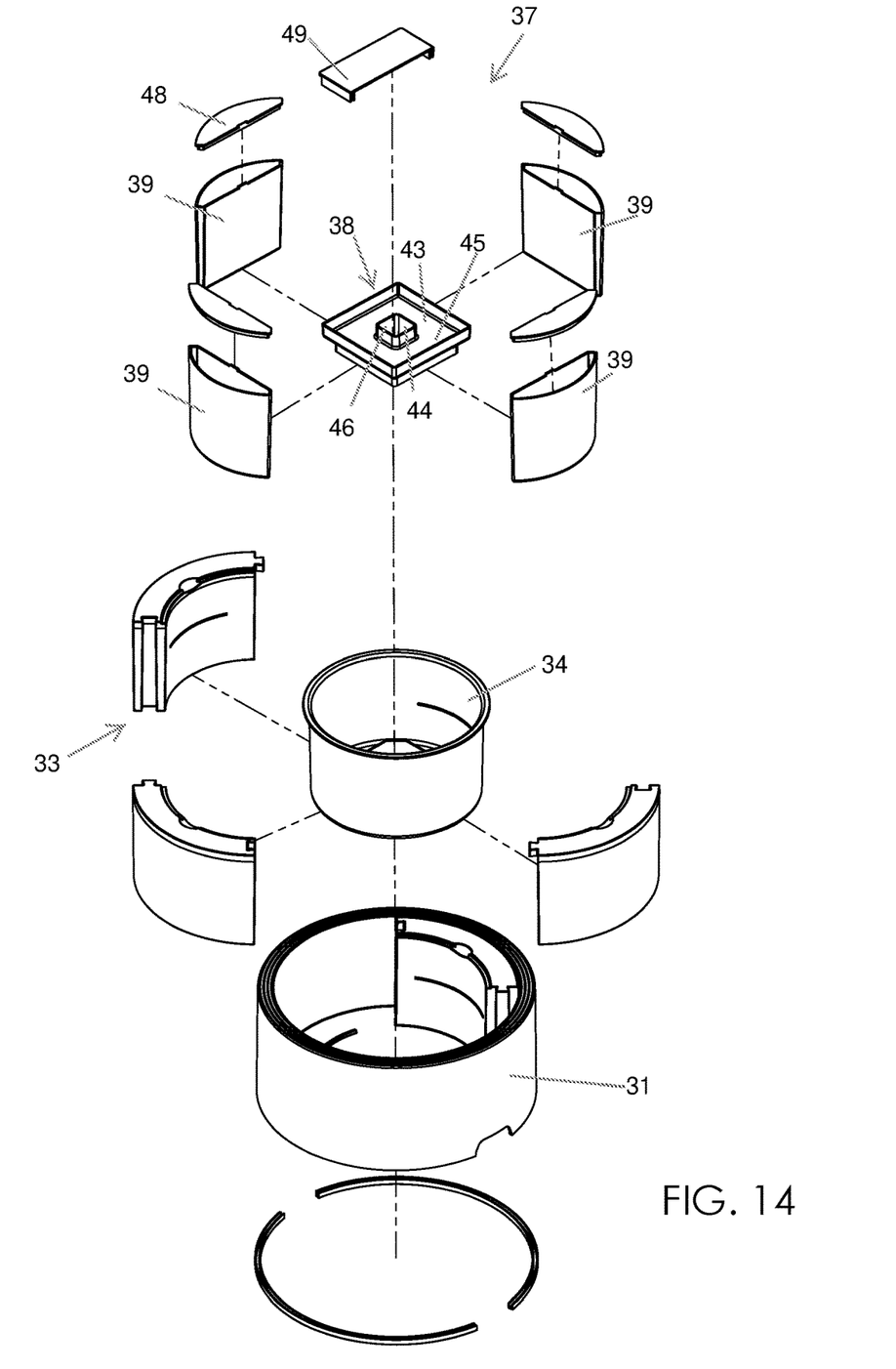
FIG. 14 is an exploded view showing the small reservoir assembly, large reservoir, interior platform members, and base, in accordance with a non-limiting exemplary embodiment of the present disclosure.
Figure 15:
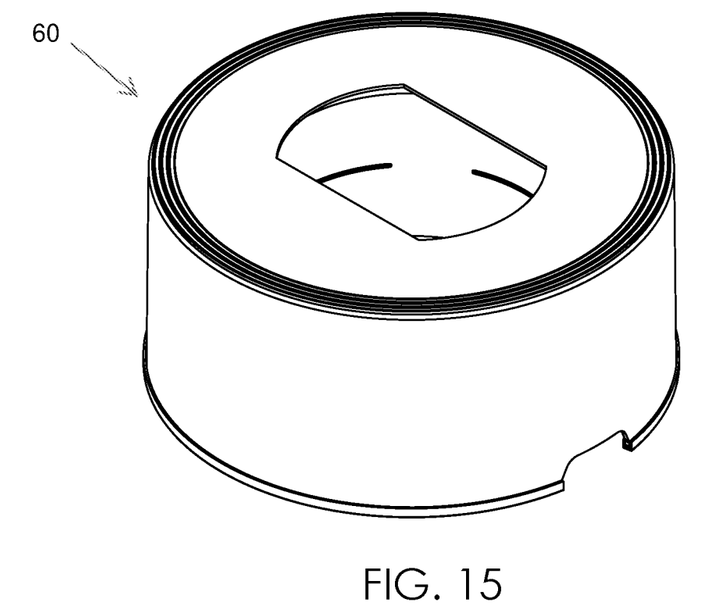
FIG. 15 is a perspective view of a companion (auxiliary training apparatus) to the kitty water potty training apparatus for training more than one cat, in accordance with a non-limiting exemplary embodiment of the present disclosure.
Figure 16:
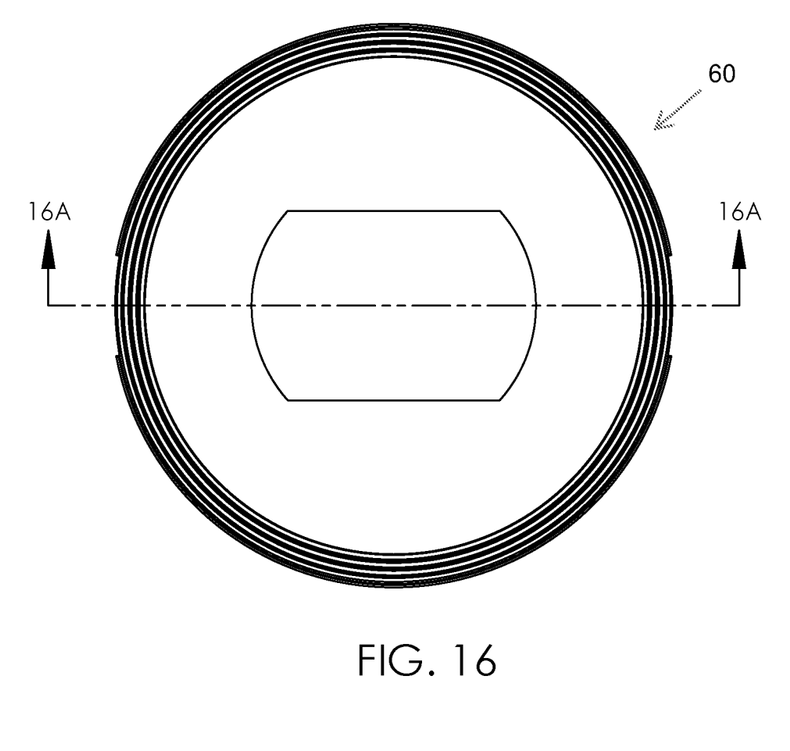
FIG. 16 is a top plan view of the companion shown in FIG. 15, in accordance with a non-limiting exemplary embodiment of the present disclosure.
Figures 16A, 16B, 17:
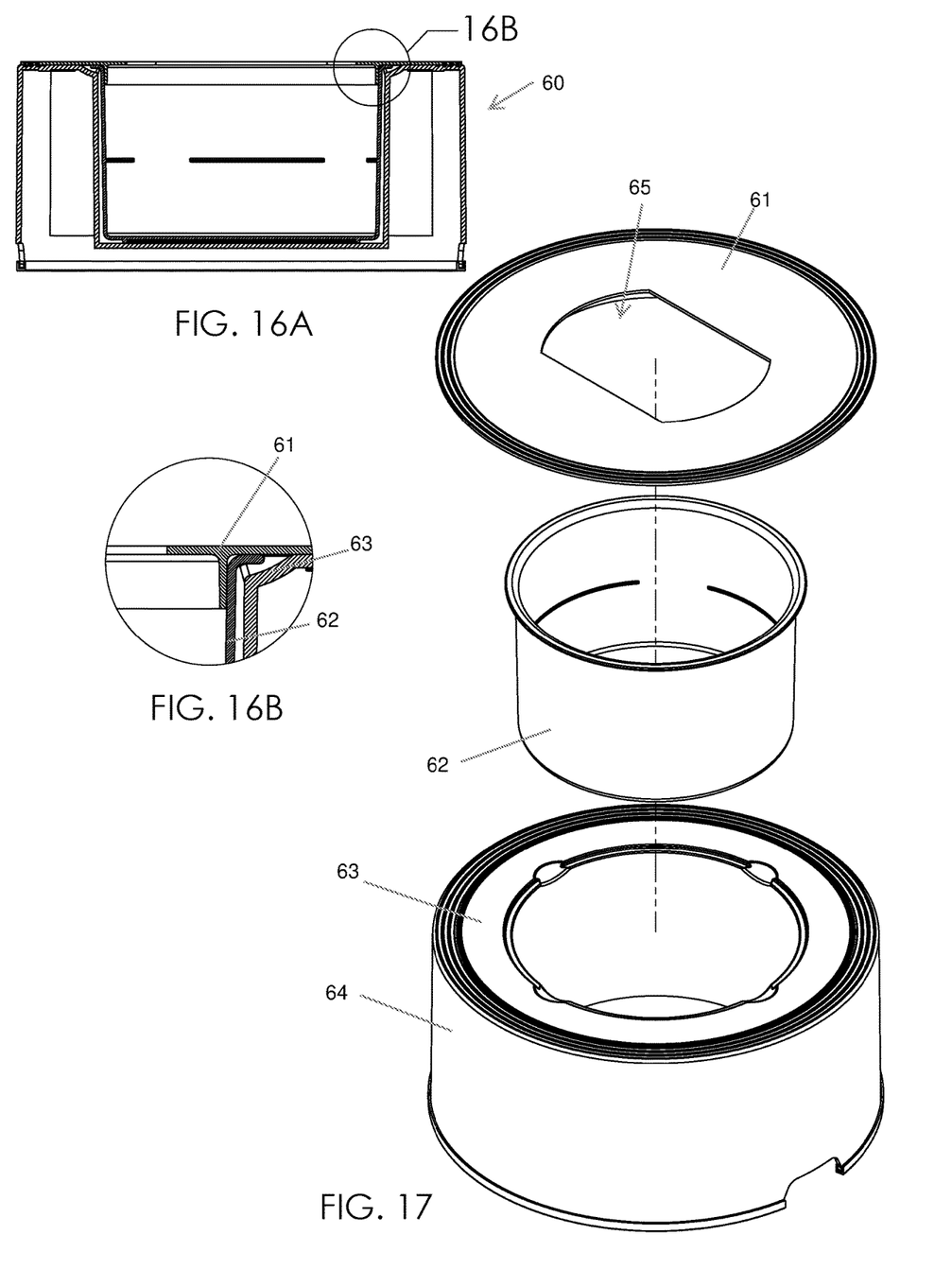
FIG. 16A is cross-sectional view taken along line 16A-16A in FIG. 16, in accordance with a non-limiting exemplary embodiment of the present disclosure.
FIG. 16B is an enlarged view taken of section 16B in FIG. 16A, in accordance with a non-limiting exemplary embodiment of the present disclosure.
FIG. 17 is an exploded view of the companion (auxiliary training apparatus) shown in FIG. 15, in accordance with a non-limiting exemplary embodiment of the present disclosure.
Figure 18:
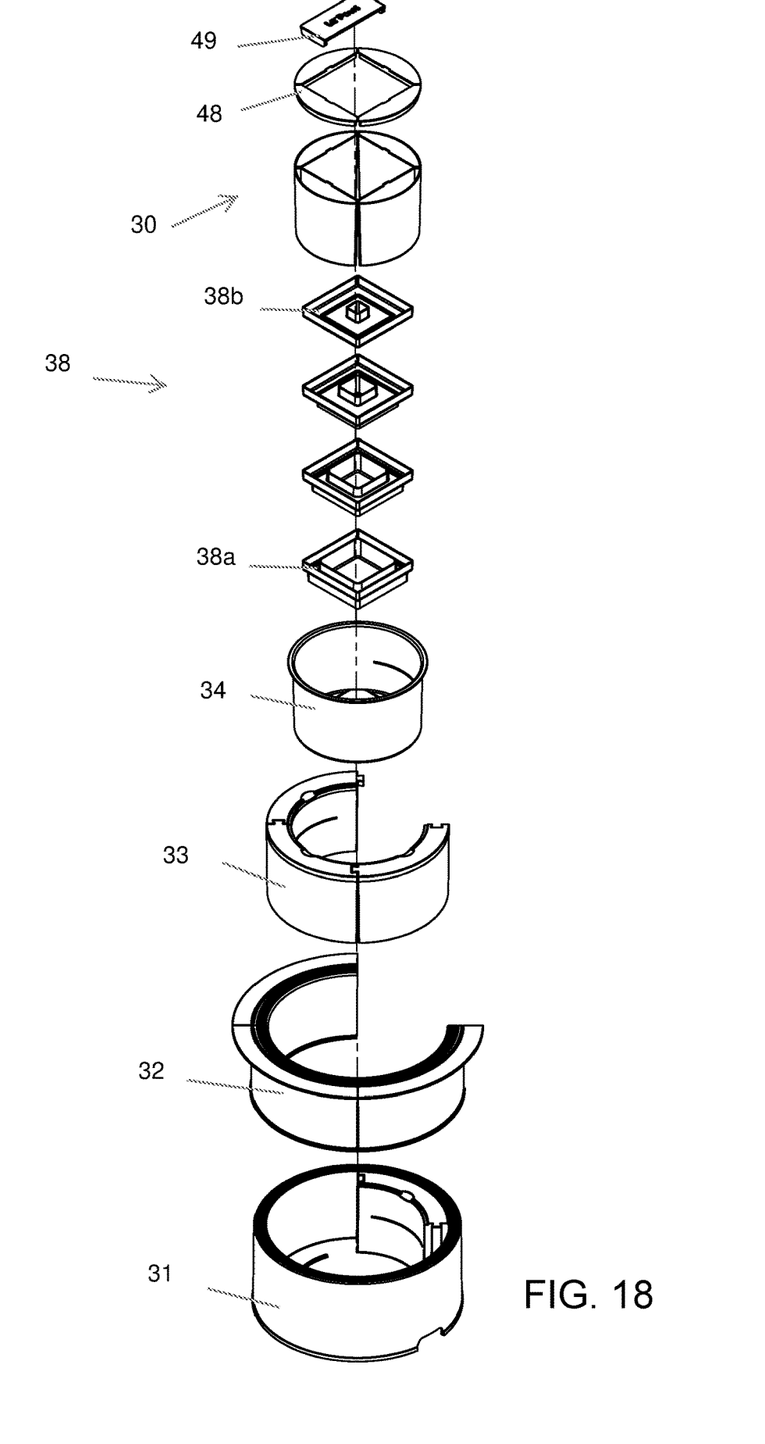
FIG. 18 is an exploded view of the kitty water potty training device with alternate sized small reservoirs, in accordance with a non-limiting exemplary embodiment of the present disclosure.

A non-limiting exemplary embodiment(s) of the present disclosure is referred to generally in FIGS. 1-18 and is intended to provide a modular kitty water potty trainer 30 that teaches a cat to defecate and urinate in a designated target area by chronologically and sequentially positioning a plurality of small reservoirs 38, interior platform members 33, and exterior platform members 32 at the designated target area. It should be understood that the exemplary embodiment(s) may be used to train a variety of cats, and should not be limited to any particular cat species described herein to sequentially adjust a quantity of cat litter 35 and water 36 during a training time period. Such a structural configuration yields the new, useful, and unpredicted result of self-self-training the cat to defecate and urinate only in the water 36 (and not the cat litter 35) with a reduced input from the cat owner. The modular kitty water potty trainer 30 is a self-training device that uses litter and water in the same device at the same time to convert cats from using litter to using only water.

Referring to FIGS. 1-18 in general, the kitty water potty training apparatus 30 includes a base 31 configured to be supported on a ground surface, a plurality of exterior platform members 32 removably engaged with an exterior surface of the base 31, a plurality of interior platform members 33 removably engaged with an interior surface of the base 31 and terminated beneath the exterior platform members 32, respectively, a large reservoir 34 configured to receive and contain cat litter 35 and being removably nested within the base 31, and a small reservoir assembly 37 configured to receive and contain both cat litter 35 and water 36 therein and is removably nested within the base 31. Advantageously, at least two portions (small reservoirs 38) of the small reservoir assembly 37 are selectively interchanged from the base 31. In this manner, the small reservoir assembly 37 and the large reservoir 34 are configured to simultaneously contain cat litter 35 while the small reservoir assembly 37 also contains water 36. Advantageously, the exterior platform members 32 are interlocked and detachably coupled in a first circular configuration 39 along an entire circumferential perimeter of the base 31. Advantageously, the interior platform members 33 are interlocked and detachably coupled in a second circular configuration 40 along an entire circumferential perimeter of the large reservoir 34. Such a structural configuration yields the new, useful, and unpredicted result of self-training the cat to defecate and urinate with a reduced input from the cat owner by chronologically and sequentially reducing the cat litter 35 and increasing the water 36 so that the cat learns to defecate and urinate in only water 36, and not cat litter 35.

In non-limiting exemplary embodiment, the exterior platform members 32 are partially disposed exterior of the base 31 and spaced from the interior platform members 33. Such a structural configuration yields the new, useful, and unpredicted result of removing fecal matter, urine, cat litter 35, and/or water 36 from the cat's paws, as well as providing a directional guide to ingress and egress the base 31.

In non-limiting exemplary embodiment, each of the exterior platform members 32 has a circumferential outer flange 41 extended outwardly beyond a circumference of the base 31. Such a structural configuration yields the new, useful, and unpredicted result of removing fecal matter, urine, cat litter 35, and/or water 36 from the cat's paws, as well as providing a directional guide to ingress and egress the base 31.

In non-limiting exemplary embodiment, the small reservoir assembly 37 includes a segmented small reservoir wall 39 seated on a bottom surface of the large reservoir 34, and a plurality of small reservoirs 38 removably seated within an interior of the segmented small reservoir wall 39. Such a structural configuration yields the new, useful, and unpredicted result of chronologically and sequentially increasing water 36 and decreasing cat litter 35 during the training process.

In non-limiting exemplary embodiment, each of the small reservoirs 38 includes a first region 43 configured to contain water 36, and a second region 44 configured to contain cat litter 35 and is isolated from the first region 43. Advantageously, the first region 43 is centrally disposed about an exterior border of the second region 44. Such a structural configuration yields the new, useful, and unpredicted result of chronologically and sequentially increasing water 36 and decreasing cat litter 35 during the training process.

In non-limiting exemplary embodiment, each of the first region 43 has a unique first surface area 45, and each of the second region 44 has a unique second surface area 46. Advantageously, a first one 45a of the unique first surface area 45 is less than a first one 46a of the unique second surface area 46. Advantageously, a last one 45b of the unique first surface area 45 is greater than a last one 46b of the unique second surface area 46. Such a structural configuration yields the new, useful, and unpredicted result of chronologically and sequentially increasing water 36 and decreasing cat litter 35 during the training process.

In non-limiting exemplary embodiment, the small reservoir assembly 37 further includes a small reservoir cap 48 removably seated on the segmented small reservoir wall 39, and a small reservoir platform 49 removably seated on the small reservoirs 38. Advantageously, the small reservoir platform 49 is configured to selectively block access to the first region 43 and the second region 44 of each small reservoir 38 during the training process. Such a structural configuration yields the new, useful, and unpredicted result of chronologically and sequentially increasing water 36 and decreasing cat litter 35 during the training process.

In non-limiting exemplary embodiment, each of the exterior platform members 32 has an outer perimeter provided with a ribbed top surface 50. Such a structural configuration yields the new, useful, and unpredicted result of removing fecal matter, urine, cat litter 35, and/or water 36 from the cat's paws, as well as providing a directional guide to ingress and egress the base 31.

In non-limiting exemplary embodiment, each of the interior platform members 33 has an outer perimeter provided with a ribbed top surface 51. Such a structural configuration yields the new, useful, and unpredicted result of removing fecal matter, urine, cat litter 35, and/or water 36 from the cat's paws, as well as providing a directional guide to ingress and egress the base 31.

Referring to FIGS. 1-18 in general, the present disclosure further includes a method that uses litter 35 and water 36 in the same training apparatus at the same time to convert cats from using litter 35 to using only water 36. Back to a clean and healthy environment and to benefit a better quality of living with a feline pet. The kitty water potty 30 eliminates the problems associated with the use of litter 35 and costs far less in the long run. It is important to note that the user is not training the cat. Allow your cat to use the kitty water potty 30 as a litter 35 box in the initial stages of training without assistance. As the area of litter 35 becomes smaller, your cat will adapt very quickly; as water 36 is slowly introduced. Within 3 weeks your cat will have transitioned from litter 35 to water 36 naturally. Once your cat's behavior has been modified to use only water 36, simply remove the large reservoir 34 and flush the remains down the toilet.

In a non-limiting exemplary embodiment, if you want to train more than one cat, the companion 60 may be employed as the final step of training two or more cat households. Once the first cat has completed its training to use only water 36, the second cat will commence training in an isolated area, thus leaving the trained cat to never use litter 35 again.

In a non-limiting exemplary embodiment, a kneading surface provides ribbed top surface 50 (ridges) on the exterior platform members 32 and interior platform members 33 of both the kitty water potty 30 and the companion 60. Such a ribbed top surface 50 advantageously guides the cat in the correct direction to allow the cat to train itself in such a short period. Without the ribbed top surface 50, a cat's owner would more than likely have to assist the cat during the training period.

In a non-limiting exemplary embodiment, at the very onset, the kitty water potty training apparatus 30 includes exterior platforms 32 with ribbed top surfaces 50 and inner built-in platforms 33 with outer ribbed top surface 55. These platforms 32, 33 were created to immediately adjust the cat to standing on a platform throughout this whole process. At this point the cat enters the litter 35 area surrounded by ribbed top surface 55 on the inner platform 33. This is a very important element, because as the cat reaches up to leave the area of litter 35, their front paws make immediate contact with the ribbed top surface 55 and begin pawing off by cleaning its paws.

In a non-limiting exemplary embodiment, as each exterior platform 32 is removed, an inside platform 33 is exposed leaving ridge 55 exposed for kneading throughout the eleven-step process. This whole process creates an area where the cat naturally starts to knead, which keeps the cat turned in the correct direction.

In a non-limiting exemplary embodiment, the other major components are the four square reservoirs 38. This is where water 36 is first introduced together in the same unit (the kitty water potty training apparatus 30) in the same square reservoir 38. As the center of a small reservoir 38 holding cat litter 35 decreases in size, the outer area holding water 36 increases in size during a four-step process. At this point the cat is going potty in litter 35 and water 36 while gradually adjusting to increasing amounts of water 36 and decreasing amounts of litter 35. Once the last square reservoir 38 is removed, only the small platform cap 48 is in place thus exposing only half the area of water 36 to the cat. When this platform cap 48 is removed and all the lids on the small reservoirs 38 are capped, all of the water 36 is exposed, and the cat will now do its business in water 36 and will never use litter 35 again.

In a non-limiting exemplary embodiment, the companion 60 is an optional component and is used only if you have to train two or more cats to convert to using water 36. The trained cat will now have to use the companion 60 to continue doing its business in water 36 while the other cat is training on the kitty water potty training apparatus 30. Advantageously, the ribbed top surfaces 50, 55, the square reservoirs 38, and the companion 60 are to this process and none of this would be possible without having litter 35 and water 36 being used simultaneously in the same apparatus 30 at the same time without assistance to train a cat to using water 36 to go potty.

In a non-limiting exemplary embodiment, the kitty water potty training apparatus 30 is a training unit for one cat. Its companion 60 is needed to while training the second cat to convert from litter 35 to only using water 36.

In a non-limiting exemplary embodiment, if you only have one cat you have the option to purchase the training unit 30 only. In the future if you decide to have more than one cat you now have to purchase its companion 60.

In a non-limiting exemplary embodiment, the companion 60 on its own is of no value without the kitty water potty training apparatus 30.

Kitty Water Potty Training Apparatus Training Method

In a non-limiting exemplary embodiment, referring to FIGS. 1-18, the modular kitty water potty trainer 30 is a self-training device that uses litter and water in the same device at the same time to convert cats from using litter to using only water. Before training begins, insert three exterior platform members 32 to the base 31, then introduce your cat to the kitty water potty training apparatus 30 by placing it near enough to their conventional litter box without using litter. The cat(s) will have a chance to familiarize themselves with the unit 30 by smelling and rubbing their scent across it. More likely than not, your cat(s) will jump and begin play inside as if it is a new toy. After a few days, once your cat(s) is comfortable, begin training. If you only have one cat, remove all the other litter boxes in the house unless you have more than one cat. Given only one choice, your cat will now use the familiarized kitty water potty training apparatus 30. It is important to isolate the cat that is training from the other cat(s).

In a non-limiting exemplary embodiment, if you only have one cat, once your cat has reached the final stage in training, continue to use the kitty water potty training apparatus 30 or transition to the smaller companion 60. The companion 60 with its continuous platform will make life easier for you. If you have more than one cat, the companion 60 is necessary, because once a cat is fully trained to use only water 36 it will be necessary to isolate the cat from the one that is now training on the kitty water potty training apparatus 30, as you don't want the trained cat going back to the conventional litter box. It is important to start with the litter you normally use, then as you advance from one step to the other in the training, gradually introduce flushable litter 35. Upon reaching step six (see below), you should use only flushable litter 35.

In a non-limiting exemplary embodiment, it is important when cleaning the unit 30 to never use an ammonia based cleaner. In order to maintain a clean environment, replaceable gloves should be used along with a two inch paintbrush and a plastic putty knife. Never use a cat litter scoop as the litter area shrinks making it difficult to use. The kitty water potty training apparatus 30 was developed for the cat to train itself without any human intervention to assist or lift the cat in any manner, regardless of age or disabilities, to convert to using water 36 to go potty and to do this in less than three weeks. Occasionally there is a cat that has trouble moving on from one step to the next. Not to worry, just repeat the last successful step before advancing. This is extremely rare, but it can happen. Whatever you do, don't assist the cat during the training process.

In a non-limiting exemplary embodiment, the cat training method includes the following chronological steps: Step 1. Add litter 35 up to the indicator line in the platforms 32, 33. Do this for two days. Step 2. Remove one exterior platform member 32, then tilt the base 31 and brush away litter 35 until there is enough room at the bottom to insert a large platform member 32. Level the base 31, then attach two suction cups to a large platform member 32, lower the large platform member 32 sliding the dovetail into place. Do this for one day. Step 3. Remove one more exterior platform member 32; repeat Step 2. Do this for one day. Step 4. Remove the last exterior platform member 32, and repeat Step 2. Do this for one day. Step 5. Remove all of the litter 35 and insert the large reservoir 34. Next: Insert the four small reservoirs 38 into the large reservoir 34. Fill the small reservoirs 38 with litter 35 to the top and temper down. Next: Add litter 35 to the large reservoir 34 up to two inches from the top. The next day lower the litter 35 down another two inches. The following day lower the litter 35 down another two inches. Remain at this level for one more day.

In a non-limiting exemplary embodiment, Step 6. Insert the small platform 49 and cap 48 onto two of the small reservoirs 38 for one day. The following day, remove all the litter 35 from the large reservoir 34. Next: Add the five inch square reservoir 38, add two inches of flushable litter 35 into the hallow 43 and one inch of water 36 to the outer shelf 44, then reinsert the small platform 49. Do this for one day. Step 7. Remove the five inch square reservoir 38; replace it with the four inch square reservoir 38; repeat Step 6. Do this for one day. Step 8. Remove the four inch square reservoir 38; replace it with the three inch square reservoir 38; repeat Step 6. Do this for one day. Step 9. Remove the three inch square reservoir 38; replace it with the two inch square reservoir 38; repeat Step 6. Do this for one day. Step 10. Remove the two inch square reservoir 38; add three inches of water 36 to the large reservoir 34; cap 48 the lids onto two of the small reservoirs 38 and reattach the small platform 49 onto the other small reservoirs 38. Do this for two days. Step 11. Remove the small platform 49 and cap 48 the last two small reservoirs 38. This is the final step, you are now ready to continue using the kitty water potty training apparatus 30 using only water 36. However, if you only have one cat, life will be even easier if you transition to using the companion 60 with its built in continuous platform. Simply fill the large reservoir 34 with water 36 up to the indicator line, insert the lid 61 and you're done. Reverse the process and flush the waste in the toilet. No fuss, no mess. No more litter 35. (Note: The companion 60 is used if you have more than one cat, because once you train your first cat to use water 36, your second cat is now training on the kitty water potty training apparatus 30 using litter 35.)

In a non-limiting exemplary embodiment, the kitty water potty training apparatus 30 solves multiple problems associated with allowing a cat to use the toilet. The bathroom must always remain open and the lid to the toilet has to be up at all times; not to mention loss of privacy, hygienics, contamination and more. Unlike trying to train your feline friend(s) to use the toilet and going through all the aggravations for months in hopes to succeed, there is a better way because the present disclosure does it naturally in two weeks and without any restrictions as to medical problems that your cat may have. However, for cats younger than three months old, the present training system is restricted to step one. Once the kitten is old enough, convert over to steps two through six (discussed above).

In a non-limiting exemplary embodiment, once a week, wash every surface of the training apparatus 30 with warm water 36.

Place the kitty water potty training apparatus 30 in the same location as the previous litter box during training. If you have more than one litter box, decide which will work best. Either replace each box with a new training apparatus 30 or gradually move the other litter box(es) toward one location. If your house is large, provide a kitty water potty training apparatus 30 at each end of the house. Regularly clean the kitty water potty training apparatus 30 and thoroughly wash weekly with an unscented mild detergent and hot water; a diluted solution of unscented chlorine bleach is safe. Never place the training apparatus 30 near a high traffic area nor near your cat's food or water bowls as cats do not like to eat near their bathroom spot.

The perfect solution to a clean and healthy home environment for both you and your feline friend(s) is the kitty water potty training apparatus 30 made of heavy-gauge 100% squared melamine impregnated with an ion-pure antimicrobial. Rubber footing are provided to prevent skidding and large interlocking wide platforms and reservoirs 32, 33 to provide a place of comfort for your feline pets. This is the best solution to the litter box on the market. The water 36 in the reservoirs 32, 33 helps by absorbing odor and vapors. The modular kitty water potty trainer is a self-training device that uses litter and water in the same device at the same time to convert cats from using litter to using only water.

In a non-limiting exemplary embodiment, the companion 60 may be provided and includes a main body 64 having a continuous platform cap 63, the large reservoir 62, and a top access panel 61 having a generally rectangular or generally square aperture 65 that will lock into place directly into and on top of the large reservoir 62. With the companion 60, the user simply pulls off the top access panel 61 and transports the large reservoir 62 to the toilet for dumping, flushing, and refilling with water 36.

In a non-limiting exemplary embodiment, the companion 60 is needed to train two or more cats, because once a cat is trained to use the kitty water potty training apparatus 30, the trained cat will no longer need litter 35.

In a non-limiting exemplary embodiment, the small reservoirs 38 can convert to a water 36 and food bowl that is tip-resistant or drag-resistant across a floor by detachably affixing at least one suction fastener to a bottom surface of the small reservoirs 38. Such a suction fastener succinctly stabilizes the small reservoirs 38 on a ground surface. The suction fastener may fit underneath a bottom section of the small reservoirs 38 and may flare outwardly with pressure with suction and stick to a variety of support surface.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. in addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. A kitty water potty training apparatus for teaching a cat to defecate and urinate in a designated target area with reduced cat owner input, said kitty water potty training apparatus comprising:
   a base configured to be supported on a ground surface;
   a plurality of exterior platform members removably engaged with an exterior surface of said base;
   a plurality of interior platform members removably engaged with an interior surface of said base and terminated beneath said exterior platform members, respectively;
   a large reservoir configured to receive and contain cat litter and being removably nested within said base; and
   a small reservoir assembly configured to receive and contain both cat litter and water therein and being removably nested within said base;
   wherein at least two portions of said small reservoir assembly are selectively interchanged from said base;
   wherein said small reservoir assembly and said large reservoir are configured to simultaneously contain cat litter while said small reservoir assembly also contains water;
   wherein said exterior platform members are interlocked and detachably coupled in a first circular configuration along an entire circumferential perimeter of said base.

2. The kitty water potty training apparatus of claim 1, wherein said exterior platform members are partially disposed exterior of said base and spaced from said interior platform members.

3. The kitty water potty training apparatus of claim 2, wherein each of said exterior platform members has a circumferential outer flange extended outwardly beyond a circumference of said base.

4. The kitty water potty training apparatus of claim 3, wherein said small reservoir assembly comprises:
   a segmented small reservoir wall seated on a bottom surface of said large reservoir; and
   a plurality of small reservoirs removably seated within an interior of said segmented small reservoir wall.

5. The kitty water potty training apparatus of claim 4, wherein each of said small reservoirs comprises:
   a first region configured to contain water; and
   a second region configured to contain cat litter and being isolated from said first region;
   wherein said first region is centrally disposed about an exterior border of said second region.

6. The kitty water potty training apparatus of claim 5, wherein each of said first region has a first surface area;
wherein each of said second region has a second surface area;
   wherein a first one of said first surface area is less than a first one of said second surface area;
   wherein a last one of said first surface area is greater than a last one of said second surface area.

7. The kitty water potty training apparatus of claim 6, wherein said small reservoir assembly further comprises:
   a small reservoir cap removably seated on said segmented small reservoir wall; and
   a small reservoir platform removably seated on said small reservoirs;
   wherein said small reservoir platform is configured to selectively block access to said first region and said second region.

8. The kitty water potty training apparatus of claim 1, wherein each of said exterior platform members has an outer perimeter provided with a ribbed top surface.

9. The kitty water potty training apparatus of claim 1, wherein each of said interior platform members has an outer perimeter provided with a ribbed top surface.

10. A kitty water potty training apparatus for teaching a cat to defecate and urinate in a designated target area with reduced cat owner input, said kitty water potty training apparatus comprising:
   a base configured to be supported on a ground surface;
   a plurality of exterior platform members removably engaged with an exterior surface of said base;
   a plurality of interior platform members removably engaged with an interior surface of said base and terminated beneath said exterior platform members, respectively;
   a large reservoir configured to receive and contain cat litter and being removably nested within said base; and
   a small reservoir assembly configured to receive and contain both cat litter and water therein and being removably nested within said base;
   wherein at least two portions of said small reservoir assembly are selectively interchanged from said base;
   wherein said small reservoir assembly and said large reservoir are configured to simultaneously contain cat litter while said small reservoir assembly also contains water;
   wherein said exterior platform members are interlocked and detachably coupled in a first circular configuration along an entire circumferential perimeter of said base;
   wherein said interior platform members are interlocked and detachably coupled in a second circular configuration along an entire circumferential perimeter of said large reservoir.

11. The kitty water potty training apparatus of claim 10, wherein said exterior platform members are partially disposed exterior of said base and spaced from said interior platform members.

12. The kitty water potty training apparatus of claim 11, wherein each of said exterior platform members has a circumferential outer flange extended outwardly beyond a circumference of said base.

13. The kitty water potty training apparatus of claim 12, wherein said small reservoir assembly comprises:
   a segmented small reservoir wall seated on a bottom surface of said large reservoir; and
   a plurality of small reservoirs removably seated within an interior of said segmented small reservoir wall.

14. The kitty water potty training apparatus of claim 13, wherein each of said small reservoirs comprises:
   a first region configured to contain water; and
   a second region configured to contain cat litter and being isolated from said first region;
   wherein said first region is centrally disposed about an exterior border of said second region.

15. The kitty water potty training apparatus of claim 14, wherein each of said first region has a first surface area; wherein each of said second region has a second surface area;
- wherein a first one of said first surface area is less than a first one of said second surface area;
- wherein a last one of said first surface area is greater than a last one of said second surface area.

16. The kitty water potty training apparatus of claim 15, wherein said small reservoir assembly further comprises:
- a small reservoir cap removably seated on said segmented small reservoir wall; and
- a small reservoir platform removably seated on said small reservoirs;
- wherein said small reservoir platform is configured to selectively block access to said first region and said second region.

17. The kitty water potty training apparatus of claim 10, wherein each of said exterior platform members has an outer perimeter provided with a ribbed top surface.

18. The kitty water potty training apparatus of claim 10, wherein each of said interior platform members has an outer perimeter provided with a ribbed top surface.

* * * * *